United States Patent
Koizumi et al.

(10) Patent No.: US 12,305,269 B2
(45) Date of Patent: May 20, 2025

(54) METHOD OF MANUFACTURING SHEET MATERIAL MADE OF COPPER-SILVER ALLOY AND METHOD OF MANUFATURING SHEET FOR ELECTRODE OF PROBE CARD

(71) Applicant: SWCC Corporation, Kanagawa (JP)

(72) Inventors: Tsutomu Koizumi, Kanagawa (JP); Go Odachi, Kanagawa (JP); Ryuichi Arai, Kanagawa (JP)

(73) Assignee: SWCC Corporation, Kanagawa (JP)

( * ) Notice: Subject to any disclaimer, the term of this patent is extended or adjusted under 35 U.S.C. 154(b) by 0 days.

(21) Appl. No.: 18/932,615

(22) Filed: Oct. 31, 2024

(65) Prior Publication Data
US 2025/0109470 A1  Apr. 3, 2025

Related U.S. Application Data

(63) Continuation of application No. PCT/JP2023/035495, filed on Sep. 28, 2023.

(51) Int. Cl.
*C22F 1/08* (2006.01)
*B22D 11/00* (2006.01)
*C22C 9/00* (2006.01)
*G01N 27/30* (2006.01)

(52) U.S. Cl.
CPC ............. *C22F 1/08* (2013.01); *B22D 11/004* (2013.01); *C22C 9/00* (2013.01); *G01N 27/30* (2013.01)

(58) Field of Classification Search
CPC ........... C22F 1/08; B22D 11/004; C22C 9/00; G01N 27/30
See application file for complete search history.

(56) References Cited

U.S. PATENT DOCUMENTS 12,148,545 B2 * 11/2024 Sakagami ................ H01B 5/02
2024/0339238 A1 * 10/2024 Odachi ..................... B21C 1/02

FOREIGN PATENT DOCUMENTS

| CN | 114318046 A | * | 4/2022 |
| JP | 2000-282157 A | | 10/2000 |
| JP | 4143086 B2 | | 9/2008 |
| JP | 2019-26921 A | | 2/2019 |
| JP | 2019026921 A | * | 2/2019 |
| JP | 2022-28598 A | | 2/2022 |

OTHER PUBLICATIONS

JP-2019026921-A, machine translation (Year: 2019).*
CN-114318046-A machine translation. (Year: 2022).*
(Continued)

*Primary Examiner* — John A Hevey
(74) *Attorney, Agent, or Firm* — Apex Juris, pllc; Hilde M. L. Coeckx

(57) ABSTRACT

A method of manufacturing sheet material made of copper-silver alloy, the method comprising the steps of: (a) casting continuously copper-silver alloy so as to obtain base material having a thickness or diameter within a range of 6 to 30 mm; (b) rolling the base material at least once so as to obtain sheet material having a thickness within a range of 0.01 to 0.10 mm; and (c) annealing the sheet material, wherein the sheet material having undergone operation in the step (c) has a Vickers hardness of 280 HV or higher.

8 Claims, 1 Drawing Sheet

(56) References Cited

OTHER PUBLICATIONS

Zhang et al., "Microstructure, mechanical properties and electrical conductivity of Cu-12 wt.% Ag wires annealed at different temperature," Materials Letters 58 (2004), pp. 3888-3892 (Year: 2004).*

Lee et al., "Effects of fine fiber structures on the mechanical and electrical properties of cold rolled Cu—Ag sheet," Journal of Materials Science Letters, 22, (2003), pp. 1751-1754 (Year: 2003).*

Castro-Dettmer, "Obtainable Microstructures in Electrical Conductors Made of Copper-Silver Alloy," IEEE Transactions on Magnetics, vol. 39, No. 1, Jan. 2003 (Year: 2003).*

International Search Report for PCT/JP2023/035495, Issued on Dec. 12, 2023, total of 3 pages.

Written Opinion of the International Searching Authority, Mailed on Dec. 12, 2023, total of 3 pages.

Office Action for JP Application No. 2024-561995, Issued on Dec. 17, 2024, Total of 5 pages.

\* cited by examiner

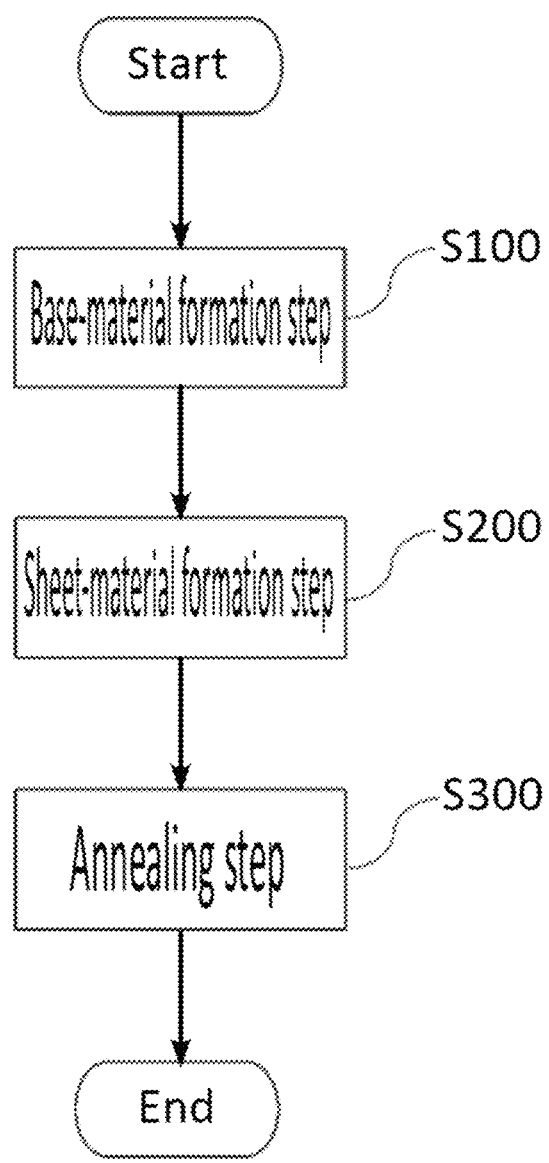

METHOD OF MANUFACTURING SHEET MATERIAL MADE OF COPPER-SILVER ALLOY AND METHOD OF MANUFATURING SHEET FOR ELECTRODE OF PROBE CARD

CROSS REFERENCE TO RELATED APPLICATIONS

This is a continuation application of International Patent Application No. PCT/JP2023/035495 filed on Sep. 28, 2023, of which full contents are incorporated herein by reference.

BACKGROUND OF THE INVENTION

Field of the Invention

The present invention relates to a method of manufacturing sheet material made of copper-silver alloy, and relates to a method of manufacturing sheet for electrode of a probe card. More specifically, the present invention relates to a method of manufacturing sheet material made of copper-silver alloy, which excels in hardness, and relates to a method of manufacturing sheet for electrode of a probe card, which excels in hardness.

Description of the Background Art

Patent Document 1 listed below discloses, as one of methods of manufacturing various parts and members using copper-silver alloy, a method of manufacturing an ultra-fine electric wire made of alloys of copper, which has high electrical conductivity and certain strength, and is unlikely to decrease in strength even under thermally loaded conditions, thereby to excel in heat resistance.

Patent Document 2 listed below also discloses a method of manufacturing alloys of copper capable of achieving high strength and high electrical conductivity.

PRIOR ART DOCUMENTS

Patent Documents

Patent Document 1: Japanese Patent No. 4143086
Patent Document 2: Japanese Patent Application Publication No. 2022-28598

Problems to be Solved

Taking note of characteristics of copper-silver alloy having high electrical conductivity, the applicant came up with the idea of making sheet, by using such alloy, for electrode of a prob card for semiconductor inspection.

For the sheet for electrode applied to such a probe card, high hardness was required; however, there had not yet been found any sheet material made of copper-silver alloy having a satisfactory level of hardness.

SUMMARY OF THE INVENTION

In view of the above, the objective of the present invention is to obtain a method of manufacturing sheet material made of copper-silver alloy, which excels in hardness, and a method of manufacturing sheet for electrode of a probe card, which excels in hardness.

Means for Solving Problems

In order to achieve the above-described objective, a preferred aspect of the present invention is to provide a method of manufacturing sheet material made of copper-silver alloy, comprising the steps of: (a) casting continuously copper-silver alloy so as to obtain base material having a thickness or diameter within a range of 6 to 30 mm; (b) rolling the base material at least once so as to obtain sheet material having a thickness within a range of 0.01 to 0.10 mm; and (c) annealing the sheet material, wherein the sheet material having undergone operation in the step (c) has a Vickers hardness of 280 HV or higher.

Further, another preferred aspect of the present invention is to provide a method of manufacturing sheet for electrode of a probe card, comprising the steps of: (a) casting continuously copper-silver alloy so as to obtain base material having a thickness or diameter within a range of 6 to 30 mm; (b) rolling the base material at least once so as to obtain sheet material having a thickness within a range of 0.01 to 0.10 mm; and (c) annealing the sheet material, wherein the sheet for electrode made of the sheet material having undergone operation in the step (c) has a Vickers hardness of 280 HV or higher.

Advantageous Effects Achieved by the Invention

According to the present invention, it is possible to obtain a method of manufacturing sheet material made of copper-silver alloy, which excels in hardness, and a method of manufacturing sheet for electrode of a probe card, which excels in hardness.

BRIEF DESCRIPTIONS OF THE DRAWINGS

FIG. 1 depicts a flow showing the steps of a method of manufacturing sheet made of copper-silver alloy according to an embodiment of the present invention.

DESCRIPTIONS OF EMBODIMENTS OF THE INVENTION

Hereinafter, examples of the present invention will be described with reference to the drawings. In this specification, "a range of . . . to . . . " indicative of a numerical range is defined as including therewithin an upper limit and a lower limit.

EXAMPLES

[1] Overall Configuration (FIG. 1)

A method of manufacturing sheet material made of copper-silver alloy according to an embodiment of the present invention includes, mainly, a base-material formation step, a sheet-material formation step, an annealing step. Hereinafter, each of the steps will be described in detail.

[2] Step (A): Base-Material Formation Step (S100)

The base-material formation step is a step of forming base material, in a predetermined shape, made of copper-silver alloy.

[2.1] Composition of Copper-Silver Alloy

The copper-silver alloy to be melted, in an embodiment of the present invention, may not be limited in composition in particular, and may be designed appropriately in accordance with characteristics required for any intended use of the sheet material after having been finished.

For example, when applying the sheet material, obtained by a method according to an embodiment of the present invention, to sheet for electrode of a probe card, the following composition may be adopted from the standpoint of obtaining high hardness:

Copper (Cu) is contained within a range of 70 to 92 mass %, and preferably, within a range of 70 to 85 mass %;

Silver (Ag) is contained within a range of 8 to 30 mass %, and preferably, within a range of 15 to 30 mass %; and Balance (including unavoidable impurities) is contained within a range of 0 to 1 mass %.

[2.2] Base-Material Formation Treatment

In an embodiment of the present invention, it is preferred that continuous casting be adopted for the base-material formation.

The continuous casting is treatment of drawing castings while cooling gradually molten metal in a mold to solidify drawn castings, thereby to obtain long integral castings.

According to such a continuous casting, an element of alloy component is likely to be distributed uniformly, and as a result, a solution treatment consisting of high-temperature heating and quenching can be skipped over.

Further, according to such a continuous casting, the base material is likely to be controlled in composition with ease (for example, control of a grain size in expectation of characteristics of a final shape of the sheet material, control of a precipitated layer remaining in a grain boundary, and the like) during the continuous casting. As a result, through appropriate management of control in composition, it can be expected that the pre-fine-grained base material is maintained in grain size until a stage of the sheet material in a final shape, and thereby, a hardness and strength of the sheet material is improved.

Still further, through appropriate management of control in composition described above, it can be assumed that the occurrence of burrs, induced due to cutting of the sheet material, is suppressed if the sheet material decreases in grain size, and thereby, yield of the sheet material is improved.

[2.3] Base-Material Shape in Cross Section

In an embodiment of the present invention, the base material is not limited in cross-sectional shape in particular, and a circular shape, a rectangular shape, or the like in cross section may be adopted appropriately for any intended use of the sheet material after having been finished.

For example, when the sheet material is low in aspect ratio (length-to-width ratio) to be used for bus bar whose thickness is 0.5 mm or more, it is preferred that the base material be in a circular shape in cross section, which is convenient in processing a rectangular electric wire for large current.

Further, it is preferred that the base material be not in a circular shape in cross section but in a rectangular shape in cross section. Upon rolling of base material having a circular shape in cross section to form thin sheet material, there are likely to occur edge crack, meandering, and the like for the base material during the rolling due to stress concentration at the center in cross section. Due to the removal of a cracked edge portion and the like, there is a probability that yield of the sheet material would not be improved. Further, due to the occurrence of a race-track cross-sectional shape (a curved shape at a side) of the sheet material after having been rolled, there is a probability that the sheet material used directly as windings without being any further treated would not increase in space factor. For this reason, the sheet material according to an embodiment of the present invention is advantageous for manufacturing of a rectangular electric wire having a high aspect ratio in particular.

[2.4] Thickness of Casted Base Material

In an embodiment of the present invention, the base material is not limited in thickness after having been casted in particular, and such a thickness may be designed appropriately in accordance with any characteristics required for the sheet material after having been finished.

For example, when it is assumed that the sheet material is used for electrode of a probe card and has a thickness within a range of 0.025 to 0.050 mm after having been obtained in the sheet-material formation step to be described later, it is preferred that a thickness of the base material be within a range of 15 to 20 mm.

This is because there appears a problem that a degree of working (reduction in thickness) cannot be secured and a necessary level of hardness can be no longer obtained for a thickness of the casted base material less than 15 mm for example, and because a working limit is reached by the casted base material in a stage of being relatively thick, which causes edge crack in particular to occur significantly for a thickness of the casted base material more than 20 mm for example. For this reason, the number of heat treatment steps has to be enhanced, which eventually raises a manufacturing cost. Further, a level of difficulty in optimizing conditions of heat treatment appears to increase, and it is more difficult to secure the reproducibility, which is problematic. In order to avoid these problems, the thickness is preferably set as described above.

[2.5] Casting Speed of Base Material

In an embodiment of the present invention, the base material is not limited in casting speed in particular, and such a speed may be designed appropriately in accordance with any characteristics required for the sheet material after having been finished. For example, when it is assumed that the sheet material is used for electrode of a probe card and has a thickness within a range of 15 to 20 mm after having been obtained in the sheet-material formation step to be described later, it is preferred that a casting speed be within a range of 50 to 1000 mm/min, and more preferably be within a range of 100 to 300 mm/min.

[3] Step (b): Sheet-Material Formation Step (S200)

The sheet-material formation step is a step of processing the base material into one having a predetermined thickness to form sheet-like member (sheet material).

In this sheet-material formation step, at least rolling is performed.

In an embodiment of the present invention, this sheet-material formation step is not limited in number of performing rolling and the like in particular, and such a number may be designed appropriately in view of a tradeoff between a thickness and characteristics of the base material at a starting point of this step and a thickness and characteristics of the sheet material at an ending point of this step.

[3.1] Rolling

The rolling is treatment of continuously applying a force to a target base material so that the base material is formed into thin sheet. In general, the rolling is performed such that a target member is caused to pass through between a pair of rotating rolls arranged in parallel to each other. In an embodiment of the present invention, this rolling is not limited in type of rolling in particular, and a cold rolling, for example, may be adopted. Further, in an embodiment of the present invention, a thickness of the base material after having been rolled (intermediate or final material as the sheet material) may be designed appropriately.

[3.2] Heat Treatment

Still further, if base material after having been rolled is further rolled, it is preferred that the base material after having been rolled be heated in advance.

In an embodiment of the present invention, the heat treatment to be performed before being further rolled is not limited in conditions of heat treatment (such as heating temperature, heating time) in particular.

[4] Step (c): Annealing Step (S300)

The annealing step is a step of heating the sheet material formed to have a predetermined thickness after having been rolled so as to remove a residual force therefrom.

[4.1] Heating Temperature

In this step, it is preferred that the sheet material after having been rolled be annealed at the heating temperature within a range of 200 to 500° C. from the viewpoint of prohibiting any recovery of the structure as well as avoiding any abnormal grain growth.

[4.2] Heating Time

This annealing step is not limited in heating time in particular because of the optimum heating time depends upon the above-described heating temperature; however, it is preferred that the sheet material after having been rolled be annealed at the heating time within a range of approximately 60 to 4500 minutes at the heating temperature within a range of 200 to 500° C.

[4.3] Thickness of Annealed Sheet Material

In an embodiment of the present invention, the sheet material is not limited in thickness after having been annealed in particular; however, it is preferred that a thickness within a range of 0.025 to 0.050 mm be achieved for the sheet material to be used for electrode of a probe card.

[5] Other Steps

In an embodiment of the present invention, the sheet material having undergone operation in the step (c) may be formed into a predetermined shape appropriately for any intended final use of the sheet material. For example, the sheet material may be cut into a predetermined width (falling within 0.5 to 2 mm) so that an ultra-fine rectangular electric wire may be formed. Further, as a result of processing the sheet material in an arbitrary shape, the treated sheet material may be used for bus bar, ribbon-type heater, electrode of a prob card for semiconductor inspection.

[6] Test Examples

A plurality of electric-wire test pieces were manufactured by a manufacture method in an embodiment of the present invention, and a Vickers hardness measurement was performed for electrical-characteristic test, through a Vickers hardness meter, in accordance with the JIS Z 2244 standards.

|  | (Pass/Fail Criteria) |
|---|---|
| "○" Pass: | 280 HV or higher |
| "×" Fail: | lower than 280 HV |

In addition, electrical resistance was measured for each test piece through a double-bridge method at an ambient temperature adjusted at 20° C. (±2° C.) in a room so that a mean value of electrical conductivity (% IACS) of each test piece was obtained at a distance between voltage terminals set to be 500 mm.

The obtained results are shown in TABLE 2 to be described later. The electrical conductivity required for electrode of a probe card is 38% IACS or higher.

[6.1] Manufacture Conditions

Manufacture conditions for each test piece are shown in TABLE 1 below.

Details in each step are as follows.

TABLE 1

| Conditions | | Test Piece 1 | Test Piece 2 | Test Piece 3 | Test Piece 4 |
|---|---|---|---|---|---|
| Alloy composition | Cu (mass %)/Ag (mass %) | 90/10 | 90/10 | 90/10 | 90/10 |
| Casting cross-sectional shape |  | Rectangle | Rectangle | Rectangle | Rectangle |
| Casting thickness or diameter | mm | 9.5 | 9.5 | 14.3 | 14.3 |
| Casting speed | mm/min | 300 | 300 | 300 | 300 |
| Solution treatment | Temperature (° C.) | — | — | — | — |
|  | Time (min) | — | — | — | — |
| Rolling condition (1) | Before-rolling thickness (mm) | 9.5 | 9.5 | 14.3 | 14.3 |
|  | After-rolling thickness (mm) | 1.83 | 1.83 | 4.56 | 2.8 |
| Heat treatment condition (1) | Temperature (° C.) | 450 | 370 | 370 | 370 |
|  | Time (min) | 2400 | 2400 | 2400 | 2400 |
| Rolling condition (2) | Before-rolling thickness (mm) | 1.83 | 1.83 | 4.56 | 2.8 |
|  | After-rolling thickness (mm) | 0.6 | 0.05 | 0.05 | 0.05 |
| Heat treatment condition (P.A.) | Temperature (° C.) |  | 200 | 200 | 200 |
|  | Time (min) |  | 60 | 60 | 60 |
| Remarks |  | Abort due to crack |  |  |  |

| Conditions | | Test Piece 5 | Test Piece 6 | Test Piece 7 |
|---|---|---|---|---|
| Alloy composition | Cu (mass %)/Ag (mass %) | 90/10 | 90/10 | 88/12 |
| Casting cross-sectional shape |  | Circle | Circle | Rectangle |
| Casting thickness or diameter | mm | 6 | 6 | 9.5 |
| Casting speed | mm/min | 300 | 300 | 300 |
| Solution treatment | Temperature (° C.) | — | — | — |
|  | Time (min) | — | — | — |
| Rolling condition (1) | Before-rolling thickness (mm) | 6 | 6 | 9.5 |
|  | After-rolling thickness (mm) | 1.83 | 1.83 | 1.83 |
| Heat treatment condition (1) | Temperature (° C.) | 450 | 370 | 370 |
|  | Time (min) | 2400 | 2400 | 2400 |
| Rolling condition (2) | Before-rolling thickness (mm) | 1.83 | 1.83 | 1.83 |
|  | After-rolling thickness (mm) | 0.6 | 0.05 | 0.05 |
| Heat treatment condition (P.A.) | Temperature (° C.) |  | 200 | 200 |
|  | Time (min) |  | 60 | 60 |
| Remarks |  | Abort due to crack |  |  |

TABLE 1-continued

| Conditions | | Test Piece 8 | Test Piece 9 | Test Piece 10 |
|---|---|---|---|---|
| Alloy composition | Cu (mass %)/Ag (mass %) | 85/15 | 85/15 | 76/24 |
| Casting cross-sectional shape | | Rectangle | Rectangle | Rectangle |
| Casting thickness or diameter | mm | 9.5 | 14.3 | 14.3 |
| Casting speed | mm/min | 300 | 300 | 300 |
| Solution treatment | Temperature (° C.) | — | — | — |
| | Time (min) | — | — | — |
| Rolling condition (1) | Before-rolling thickness (mm) | 9.5 | 14.3 | 14.3 |
| | After-rolling thickness (mm) | 1.83 | 2.8 | 2.8 |
| Heat treatment condition (1) | Temperature (° C.) | 370 | 370 | 370 |
| | Time (min) | 2400 | 2400 | 2400 |
| Rolling condition (2) | Before-rolling thickness (mm) | 1.83 | 2.8 | 2.8 |
| | After-rolling thickness (mm) | 0.05 | 0.05 | 0.05 |
| Heat treatment condition (P.A.) | Temperature (° C.) | 200 | 200 | 200 |
| | Time (min) | 60 | 60 | 60 |
| | Remarks | | | |

In the base-material formation step (a), raw materials were heated to be melted within a range of 1000 to 1400° C. so that composition (molten metal) having a composition ratio shown in TABLE 1 was prepared.

The melt (molten metal) was caused to flow into a mold at a casting speed of 300 mm/min, and cooled down to a room temperature within 10 minutes so that base material "A" having a thickness or diameter within a range of 6 to 14.3 mm was casted.

In the sheet-material formation step (b), the base material "A" was cold-rolled in thickness or diameter from within a range of 6 to 14.3 mm down to within a range of 1.83 to 4.56 mm so that sheet material "B" after having been cold-rolled was produced.

Thereafter, the sheet-material "B" after having been cold-rolled was heated for 2400 minutes within a range of 370 to 450° C. in an atmosphere of gaseous nitrogen ($N_2$).

Thereafter, the sheet-material "B" after having been cold-rolled and then having been heated was further cold-rolled in thickness from within a range of 1.83 to 4.56 mm to within a range of 0.05 to 0.6 mm so that sheet material "C" having a required thickness was produced.

In the annealing step (c), the sheet-material "C" was annealed for 60 minutes at 200° C. in an atmosphere of gaseous nitrogen ($N_2$) so that Test Pieces 1 to 10 were obtained.

[6.2] Measurement Results

Results of measurements for each test piece are shown in TABLE 2 below.

REFERENCE NUMERALS

S100: Base-material formation step
S200: Sheet-material formation step
S300: Annealing step
A: Base material
B: Base material after having been rolled
C: Sheet material

What is claimed is:

1. A method of manufacturing a sheet material made of a copper-silver alloy, the method comprising the steps of:
   (a) casting continuously the copper-silver alloy so as to obtain a base material having a thickness or a diameter within a range of 6 to 30 mm, wherein the copper-silver alloy, to be casted continuously, consists of: copper within a range of 70 to 92 mass %; silver within a range of 8 to 30 mass %; and a balance including unavoidable impurities within a range of 0 to 1 mass %;
   (b) rolling the base material at least once so as to obtain the sheet material having a thickness within a range of 0.01 to 0.10 mm; and
   (c) annealing the sheet material; and
      wherein the sheet material having undergone step (c) has an electrical conductivity of 38% IACS or higher and a Vickers hardness of 280 HV or higher.

2. A method of manufacturing a sheet material made of a copper-silver alloy, the method comprising the steps of:
   (a) casting continuously the copper-silver alloy so as to obtain a base material having a thickness or a diameter

TABLE 2

| Pass/Fail evaluation | | Test Piece 1 | Test Piece 2 | Test Piece 3 | Test Piece 4 | Test Piece 5 | Test Piece 6 | Test Piece 7 | Test Piece 8 | Test Piece 9 | Test Piece 10 |
|---|---|---|---|---|---|---|---|---|---|---|---|
| Vickers hardness | HV | | 267 | 292 | 304 | | 286 | 286 | 286 | 317 | 320 |
| Electrical conductivity | % IACS | | 69.2 | 60.7 | 63.4 | | 68.5 | 62.6 | 61.8 | 62.3 | 57.5 |
| Results | | x Fail | x Fail | ○ Pass | ○ Pass | x Fail | ○ Pass | ○ Pass | ○ Pass | ○ Pass | ○ Pass |

[6.3] Verified Results

As shown in TABLE 2, it was experimentally verified that each sheet material according to Test Pieces 3, 4 and Test Pieces 6 to 10 is capable of achieving a Vickers hardness of 280 HV or higher as well as electrical conductivity of 38% IACS or higher.

within a range of 6 to 30 mm, wherein the copper-silver alloy, to be casted continuously, consists of: copper within a range of 70 to 92 mass %; silver within a range of 8 to 30 mass %; and a balance including unavoidable impurities within a range of 0 to 1 mass %;

(b) rolling the base material at least once so as to obtain the sheet material having a thickness within a range of 0.01 to 0.10 mm; and (c) annealing the sheet material; and wherein a casting speed in step (a) falls within a range of 50 to 1000 mm/min, a heating temperature falls within a range of 200 to 500° C., and a heating time falls within a range of 60 to 4500 minutes in step (c), and the sheet material having undergone step (c) has an electrical conductivity of 38% IACS or higher, and has a Vickers hardness of 280 HV or higher.

3. A method of manufacturing a sheet for an electrode of a probe card, the method comprising the steps of:

(a) casting continuously a copper-silver alloy so as to obtain a base material having a thickness or a diameter within a range of 6 to 30 mm, wherein the copper-silver alloy, to be casted continuously, consists of: copper within a range of 70 to 92 mass %; silver within a range of 8 to 30 mass %; and a balance including unavoidable impurities within a range of 0 to 1 mass %;

(b) rolling the base material at least once so as to obtain a sheet material having a thickness within a range of 0.01 to 0.10 mm; and (c) annealing the sheet material; and wherein the sheet made of the sheet material having undergone step (c) has an electrical conductivity of 38% IACS or higher and a Vickers hardness of 280 HV or higher.

4. A method of manufacturing a sheet for an electrode of a probe card, the method comprising the steps of:

(a) casting continuously a copper-silver alloy so as to obtain a base material having a thickness or a diameter within a range of 6 to 30 mm, wherein the copper-silver alloy, to be casted continuously, consists of: copper within a range of 70 to 92 mass %; silver within a range of 8 to 30 mass %; and a balance including unavoidable impurities within a range of 0 to 1 mass %;

(b) rolling the base material at least once so as to obtain a sheet material having a thickness within a range of 0.01 to 0.10 mm; and (c) annealing the sheet material; and wherein a casting speed in step (a) falls within a range of 50 to 1000 mm/min, a heating temperature falls within a range of 200 to 500° C., and a heating time falls within a range of 60 to 4500 minutes in step (c), and the sheet made of the sheet material having undergone step (c) has an electrical conductivity of 38% IACS or higher and a Vickers hardness of 280 HV or higher.

5. The method of manufacturing a sheet material made of a copper-silver alloy according to claim 1, wherein the sheet material having undergone step (c) has an electrical conductivity of 57.5% IACS or higher.

6. The method of manufacturing a sheet material made of a copper-silver alloy according to claim 2, wherein the sheet material having undergone step (c) has an electrical conductivity of 57.5% IACS or higher.

7. The method of manufacturing a sheet for an electrode of a probe card according to claim 3, wherein the sheet material having undergone step (c) has an electrical conductivity of 57.5% IACS or higher.

8. The method of manufacturing a sheet for an electrode of a probe card according to claim 4, wherein the sheet material having undergone step (c) has an electrical conductivity of 57.5% IACS or higher.

* * * * *